US009538833B2

(12) United States Patent
Rowley (10) Patent No.: US 9,538,833 B2
(45) Date of Patent: Jan. 10, 2017

(54) ASSEMBLY FOR STORING AND DEPLOYING FOR USE A HANDHELD DIGITAL DEVICE (71) Applicant: Donald Lee Rowley, Hutchinson, KS (US)

(72) Inventor: Donald Lee Rowley, Hutchinson, KS (US)

(*) Notice: Subject to any disclaimer, the term of this patent is extended or adjusted under 35 U.S.C. 154(b) by 0 days.

(21) Appl. No.: 14/994,348

(22) Filed: Jan. 13, 2016

(65) Prior Publication Data
US 2016/0120295 A1 May 5, 2016

(51) Int. Cl.
*H04M 1/04* (2006.01)
*A45F 5/00* (2006.01)
*F16M 11/04* (2006.01)
*F16M 11/10* (2006.01)
*F16M 13/00* (2006.01)
*F16M 13/02* (2006.01)
*F16M 13/04* (2006.01)
*G06F 1/16* (2006.01)

(52) U.S. Cl.
CPC ............ *A45F 5/00* (2013.01); *F16M 11/041* (2013.01); *F16M 11/10* (2013.01); *F16M 13/00* (2013.01); *F16M 13/022* (2013.01); *F16M 13/04* (2013.01); *G06F 1/16* (2013.01); *A45F 2005/006* (2013.01); *A45F 2200/0508* (2013.01); *A45F 2200/0516* (2013.01); *A45F 2200/0525* (2013.01); *H04M 1/04* (2013.01)

(58) Field of Classification Search
CPC .................. A45F 2200/0516; A45C 2011/002; H04B 1/3877; H04M 1/04
See application file for complete search history.

(56) References Cited

U.S. PATENT DOCUMENTS

| 6,550,108 | B2 | 4/2003 | Pratl |
| 6,591,461 | B2 | 7/2003 | Salentine et al. |
| D521,726 | S | 5/2006 | Tarantino |
| D565,290 | S | 4/2008 | Brandenburg et al. |
| 7,971,845 | B2* | 7/2011 | Galant ............... A47F 5/16 174/50 |
| D653,655 | S | 2/2012 | Polito et al. |
| D663,725 | S | 7/2012 | Polito et al. |
| D672,278 | S | 12/2012 | Kalbach |
| D672,279 | S | 12/2012 | Kalbach |
| D690,928 | S | 10/2013 | Zhang |

(Continued)

FOREIGN PATENT DOCUMENTS

WO WO2015048006 A2 4/2015
WO WO2015095943 A1 7/2015

*Primary Examiner* — Bradley Duckworth
(74) *Attorney, Agent, or Firm* — Kenneth H. Jack; Davis & Jack, L.L.C.

(57) ABSTRACT

An assembly for storing and deploying for use a hand held digital device, the assembly incorporating a case adapted for nestingly receiving the hand held digital device; a first pin and socket fastener having upper and lower halves, the upper half being fixedly attached to or formed wholly with the case; a flexible lanyard; a pair of loops interconnecting the flexible lanyard and the first pin and socket fastener's lower half; a base; a second pin and socket fastener; and a hinge mount interconnecting the second pin and socket fastener and the base; the first pin and socket fastener's socket being adapted to function as the second pin and socket fastener's pin.

9 Claims, 7 Drawing Sheets (56) References Cited

U.S. PATENT DOCUMENTS

| | | |
|---|---|---|
| D705,767 S | 5/2014 | Yoon |
| D711,886 S | 8/2014 | Kerawala et al. |
| 8,794,560 B2 * | 8/2014 | Salentine ................ A45F 5/004 242/379.2 |
| D714,278 S | 9/2014 | Case et al. |
| D726,174 S | 4/2015 | Wahlin |
| 9,059,777 B2 * | 6/2015 | Shattuck ................ H04M 1/05 |
| 9,164,362 B2 | 10/2015 | Henry et al. |
| 9,179,762 B2 | 11/2015 | Paugh et al. |
| 2004/0029623 A1 | 2/2004 | Ellis et al. |
| 2004/0069823 A1 | 4/2004 | Condiff |
| 2005/0011982 A1 * | 1/2005 | Salentine ................ A45F 5/004 242/379.2 |
| 2006/0113345 A1 | 6/2006 | Zoullas et al. |
| 2006/0124676 A1 | 6/2006 | Mastrosimone |
| 2006/0272890 A1 | 12/2006 | Harmon et al. |
| 2007/0278265 A1 | 12/2007 | Contente |
| 2009/0120980 A1 | 5/2009 | Calayo |
| 2010/0206925 A1 | 8/2010 | Fielding, Jr. |
| 2012/0273541 A1 | 11/2012 | Zwach |
| 2013/0240578 A1 * | 9/2013 | Yu .......................... H04B 1/385 224/197 |
| 2015/0014376 A1 * | 1/2015 | Dannan ................ A45F 5/021 224/250 |
| 2015/0076183 A1 * | 3/2015 | Palma .................... A45F 5/004 224/162 |
| 2015/0091729 A1 * | 4/2015 | Phillips .............. G08B 13/1427 340/568.2 |
| 2015/0148103 A1 * | 5/2015 | Samsilova ........... H04M 1/0249 455/559 |
| 2015/0195392 A1 * | 7/2015 | Nissenbaum ........... H04M 1/04 455/569.1 |
| 2015/0201743 A1 * | 7/2015 | Erickson-Davis ........ A45F 5/00 224/218 |
| 2015/0237997 A1 * | 8/2015 | Bruns ...................... A45F 5/02 224/191 |
| 2015/0245700 A1 | 9/2015 | Merzon |
| 2015/0305480 A1 * | 10/2015 | Brousseau ................ A45F 5/10 224/267 |
| 2015/0305518 A1 * | 10/2015 | Galant ................ F16M 11/041 248/551 |
| 2015/0309395 A1 * | 10/2015 | Tomasewski ........ F16M 11/105 455/575.1 |
| 2015/0311938 A1 | 10/2015 | Molnar |
| 2015/0334220 A1 * | 11/2015 | Shannon ................ H04M 1/04 455/575.1 |
| 2015/0341067 A1 * | 11/2015 | Truchalska ............. H04M 1/04 455/573 |
| 2015/0362828 A1 * | 12/2015 | Patel .................... G03B 17/565 348/75 |
| 2016/0007723 A1 * | 1/2016 | Georges .................... A45F 5/00 224/580 |
| 2016/0007735 A1 * | 1/2016 | Gallup ............... A44B 11/2592 248/447.1 |
| 2016/0065702 A1 * | 3/2016 | Carnevali ............. G06F 1/1628 455/575.8 |

* cited by examiner

ASSEMBLY FOR STORING AND DEPLOYING FOR USE A HANDHELD DIGITAL DEVICE

FIELD OF THE INVENTION

This invention relates to small handheld digital devices such as cell phones, smart phones, personal digital assistants, calculators, handheld game consoles, portable media players and the like. More particularly, this invention relates to assemblies for personally storing and deploying such devices for use.

BACKGROUND OF THE INVENTION

Handheld digital devices such as cell phones and smart phones are commonly stored within purses or pockets, and, during use, such devices are typically held and supported by a user's hands. Storage of such devices within pockets and purses is often inconvenient and causes difficulties in accessing the device. Also, hand support of such devices during use often undesirably occupies the user's hands which may be needed for performance of other tasks.

The instant inventive assembly for storing and deploying for use a handheld digital device solves or ameliorates problems and challenges discussed above by providing specialized case, fastener, and base components which allow for lanyard suspension of the device from a user's neck, and which allow base supported deployment from the user's neck or upon a surface for hands-free use.

BRIEF SUMMARY OF THE INVENTION

A first structural component of the instant inventive assembly comprises a case which is configured and adapted for nestingly receiving, holding, and protecting a handheld digital device such as a cell phone or smart phone. In a preferred embodiment, the invention's case component is composed of durable injection molded plastic.

A further structural component of the instant inventive assembly comprises a first pin and socket fastener, such fastener having upper and lower halves. In the preferred embodiment, the upper half of such fastener is fixedly attached to or is wholly or integrally molded with the preferably plastic case component.

A further structural component of the instant inventive assembly comprises a flexible lanyard, preferably in the form of a neck loop or necklace. Preferably, the flexible lanyard comprises a woven synthetic fiber or cotton fiber strap or belt. Suitably, the flexible lanyard component may alternatively comprise leather strapping, a braided cord, or a length of chain.

A further structural component of the instant inventive assembly comprises means for interconnecting the flexible lanyard component and the lower half of the first pin and socket fastener. In a preferred embodiment, such interconnecting means comprise a loop or eye which is attached to or is integrally formed at a lower end of the first pin and socket fastener. In a preferred embodiment, such means' loop resides at the lower end of the first pin and socket fastener's pin. Alternatively, where the lower half of the first pin and socket fastener comprises a socket, such loop may reside at a lower end of such socket. The lanyard's interconnecting means preferably further comprise a second loop which is adapted for engaging the first loop, the second loop being fixedly attached to or formed wholly with a distal end of the lanyard. Alternatively, said interconnecting means may comprise an overmolded or adhesively bonded connection of the lanyard to the first pin and socket fastener. Other commonly known fasteners, such as screw fasteners and snap fasteners may be suitably substituted and utilized as lanyard interconnecting means.

In use of the instant inventive assembly, a user of the handheld digital device may suspend and personally store the device at the distal end of the lanyard while the lanyard hangs about the user's neck. During active use of the handheld digital device, the user may disengage the first pin and socket fastener for use of the device separate from the lanyard. Alternatively, the user may utilize the device in a hand held fashion while the device continues to be connected to the lanyard.

In order to additionally facilitate hands free use of the handheld digital device, the instant inventive assembly preferably further comprises support base and second pin and socket fastener components. In the preferred embodiment, such fastener component is specially configured for nesting receipt of the first pin and socket fastener's socket, such configuration allowing components of the first pin and socket fastener to additionally function as a pin component of the second pin and socket fastener. A base mounting means component, such as a hinge joint positioned and adapted for securing the second pin and fastener socket over the base, is also preferably provided.

In use of the rendition of the inventive assembly which incorporates the above described base components, and upon fastening of the first pin and socket fastener, such fastener may be slidably received or fastened within the hollow bore of the second pin and socket fastener. Such fastening of the second pin and socket fastener allows the case and its nestingly received handheld digital device to be conveniently raised and displayed for use over the base.

Accordingly, objects of the instant invention include the provision of an assembly for storing and deploying for use a handheld digital device which incorporates structures as described above, and which arranges those structures in relation to each other in manners described above for the achievement of the beneficial functions described above.

Other and further objects, benefits, and advantages of the instant invention will become known to those skilled in the art upon review of the Detailed Description which follows, and upon review of the appended drawings.

DETAILED DESCRIPTIONS OF PREFERRED EMBODIMENTS

Figure 1:
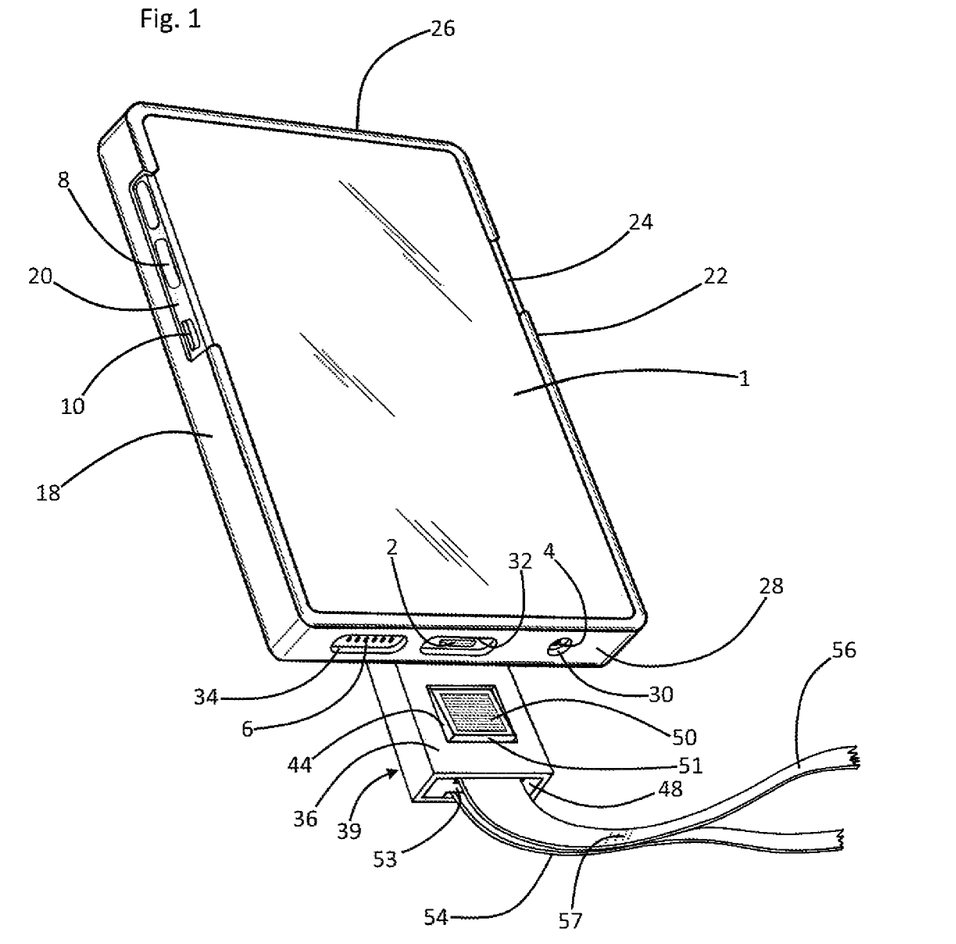
FIG. 1 is a perspective view of a preferred embodiment of the instant inventive assembly for storing and deploying for use a handheld digital device.
Figure 2:
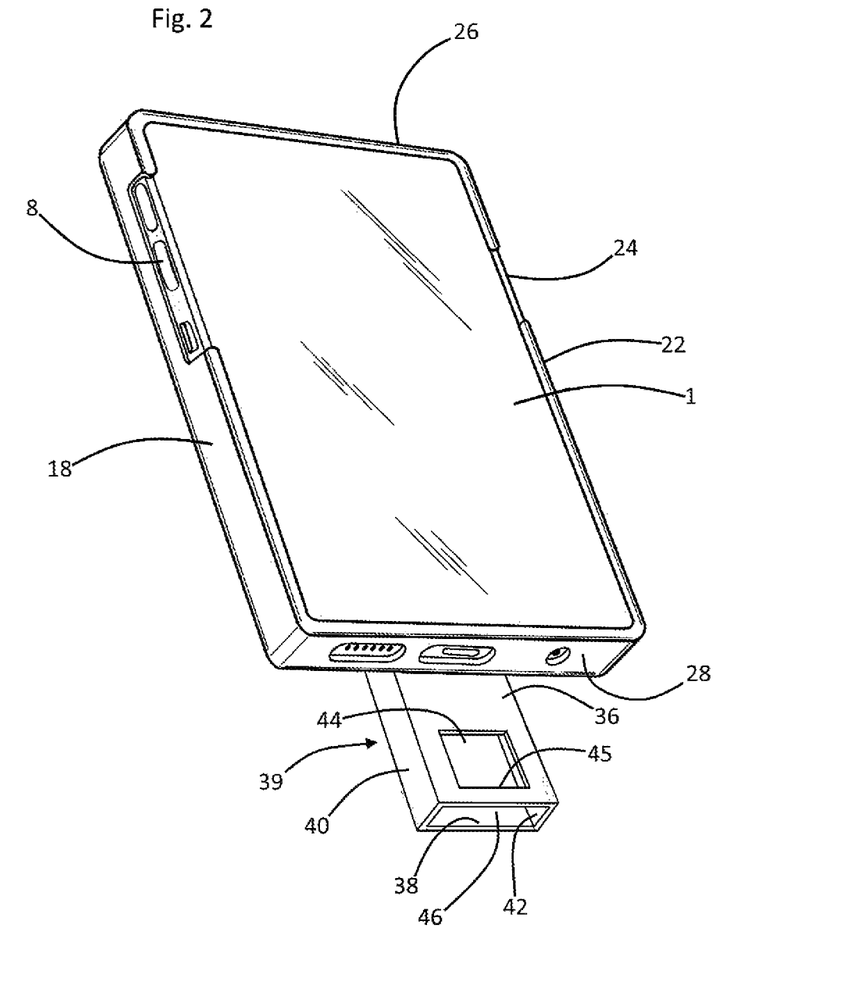
FIG. 2 redepicts the structure of FIG. 1, the view of FIG. 2 showing the removal of a lower half of a first pin and socket fastener component.
Figure 3:
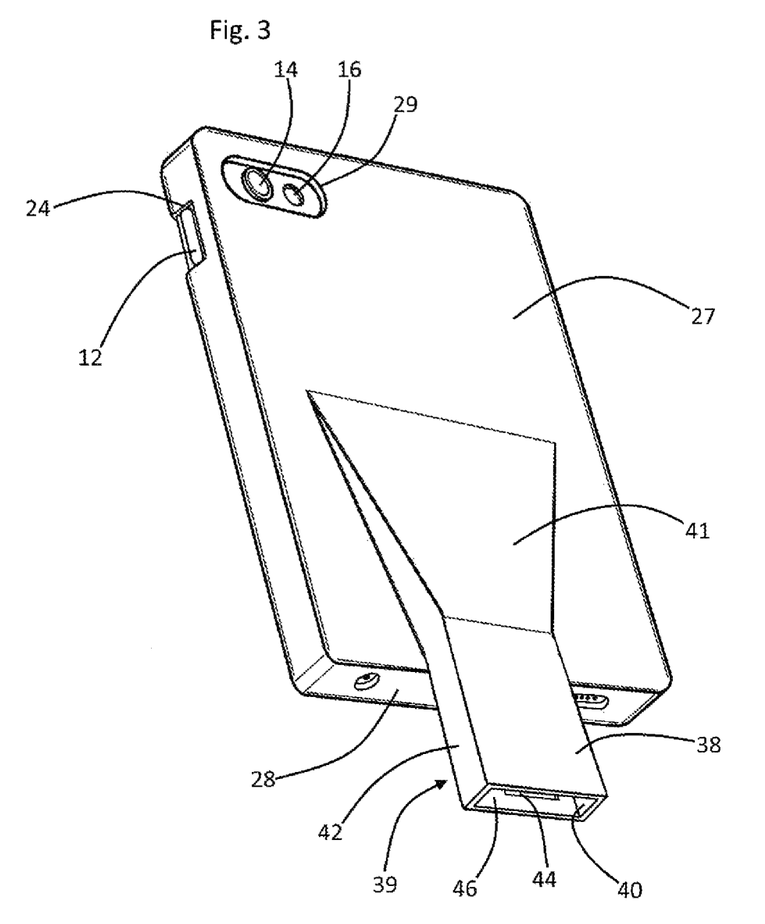
FIG. 3 is a reverse perspective view of the structure depicted in FIG. 2.

Referring now to the drawings, and in particular simultaneously to Drawing FIGS. 1-3, a conventional cell phone has a frontward or forward glass touch screen 1, volume switches 8, a mute switch 10, an on/off switch 12, a camera 14 and flash 16, a power cord socket 2, a headphone socket 4, and speaker sound ports 6, such cell phone being representative of various types of handheld digital devices which may be utilized with and served by the instant inventive assembly.

Corresponding with the cell phone, a case component of the instant inventive assembly has left and right side walls 18 and 22, an upper wall 26, a lower wall 28, and a back wall 27, the right wall 22 having an on/off switch slot 24, the left wall 18 having a volume switch slot 20, and the lower wall 28 having headphone, power cord, and speaker ports 30, 32, and 34. Consistently with the common positioning of a power cord socket at a cell phone's lower end, wall 28 comprises the case's lower end or lower wall. The instant invention's case component 18,22,26,27,28 securely and nestingly receives and protects the depicted handheld digital device component.

Figure 4:
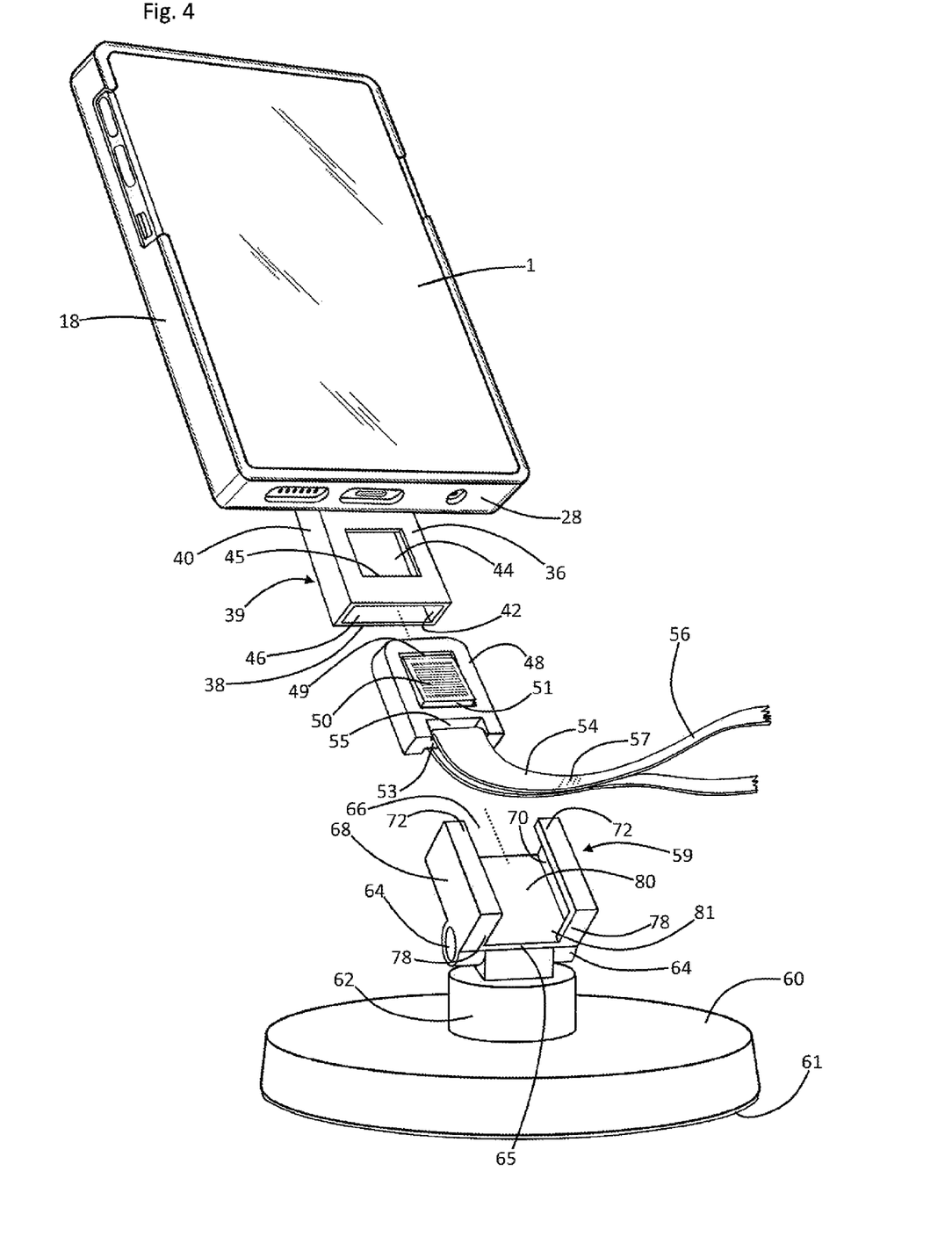
FIG. 4 redepicts the structure of FIG. 1, the view of FIG. 4 showing a disengagement of upper and lower halves of the first pin and socket fastener component, the view further showing base support structures.

A further structural component of the instant inventive assembly comprises a first pin and socket fastener, an example of which is depicted in a disassembled form in Drawing FIGS. 2, 3, and 4. Each of the invention's pin and socket fastener components is preferably configured to include upper and lower halves, and in example of FIGS. 2-4, the upper half of the depicted fastener comprises a socket (referred to generally by Reference Arrow 39) and the lower half comprises a pin 48. Socket 39 has a front wall 36, a back wall 38, a left wall 40, and a right wall 42, such walls defining a hollow bore having a lower pin receiving opening 46. As is particularly indicated in FIG. 3, the upper end of socket 39 forms a case junction 41 which is either fixedly attached to or formed wholly with the case's back or wall 27. Suitably, the case junction 41 may alternatively comprise a component which is adhesively bonded in a retrofitting fashion to an otherwise substantially conventional cell phone case.

Referring to FIG. 4, the pin component 48 of the invention's first pin and socket fastener is preferably closely fitted for slidable and nesting upward extension into and receipt within the lower opening 46 of such fastener's socket component 39. Suitably, the lower half of the first pin and socket fastener may be alternatively configured as an inverted socket component, while the fastener's upper half comprises a correspondingly inverted pin which is configured similarly with pin 48 (such inverted configuration not appearing within views). Accordingly, the exemplary first pin and socket fastener depicted in the drawings is intended as being representative of such fastener's mechanical inverse.

A further structural component of the instant inventive assembly comprises a flexible lanyard which is represented by strap 56. In the preferred embodiment, the flexible lanyard 56 forms a neck suspension loop. The lanyard 56 is intended as being representative of other commonly known necklace or neck loop materials such as leather strapping, braided cords, woven fabric strapping, and chains.

A further structural component of the instant inventive assembly comprises means for interconnecting the flexible lanyard 56 and the lower half of the first pin and socket fastener, such lower half comprising either a pin or a socket, as the case may be. In the example of Drawing FIG. 4, such interconnecting means comprise an interconnected pair of loops which attach the distal end of the lanyard 56 to the pin 48. As depicted, such loop pair may comprise a crossbar 53 and eye combination which is integrally formed at the lower end of the pin 48, the loop pair further comprising and a second loop 54 formed by stitching at a distal end of lanyard 56. Such loop pair 53,55,54,57 is intended as being representative of other commonly known means for attaching tethers, ties, and the like to pendant structures such as snap hooks, screw fasteners, pressure fitted fasteners, snap fasteners, and overmolded joints.

Figure 5:
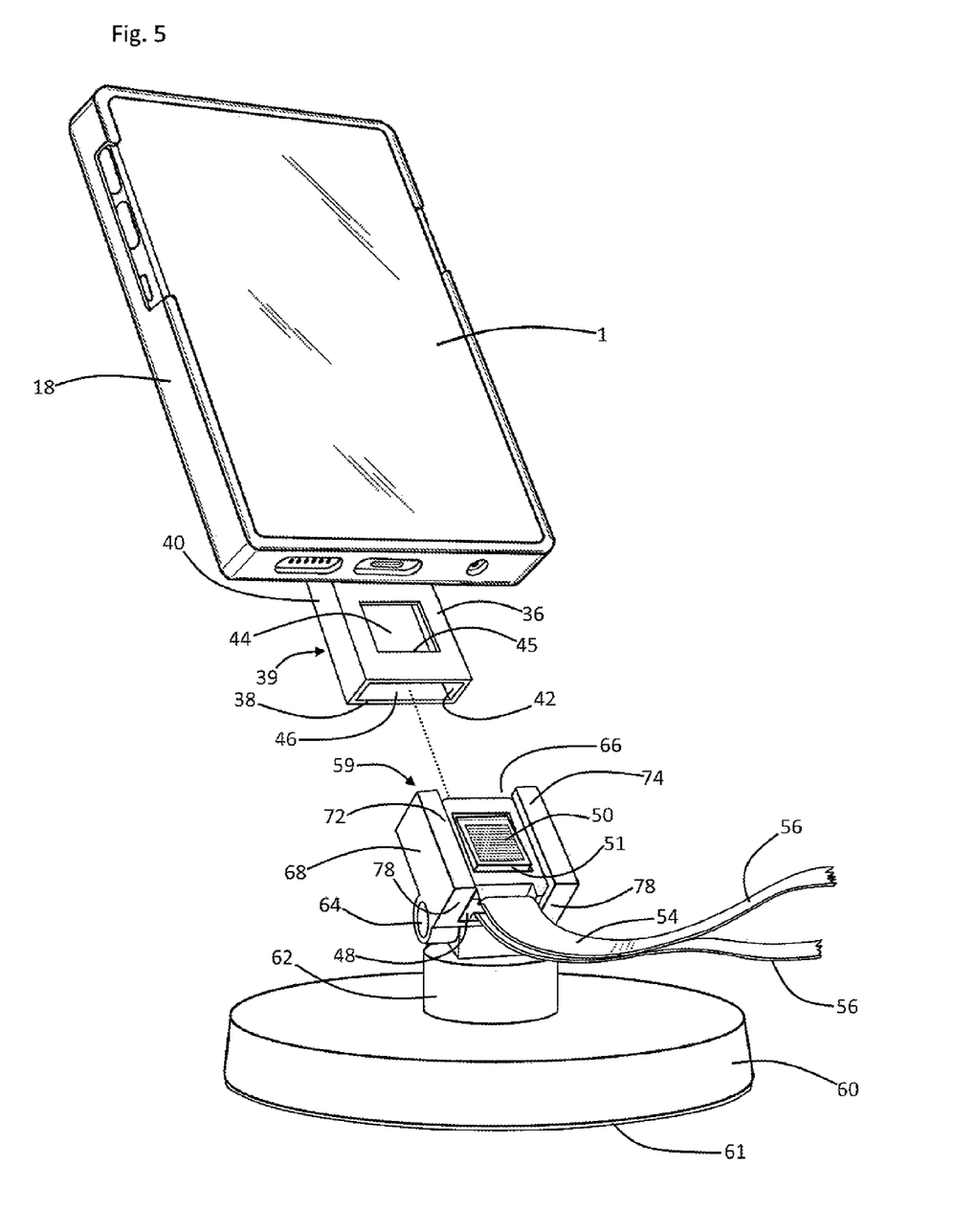
FIG. 5 presents an alternate configuration of the structures depicted in FIG. 4.
Figure 6:
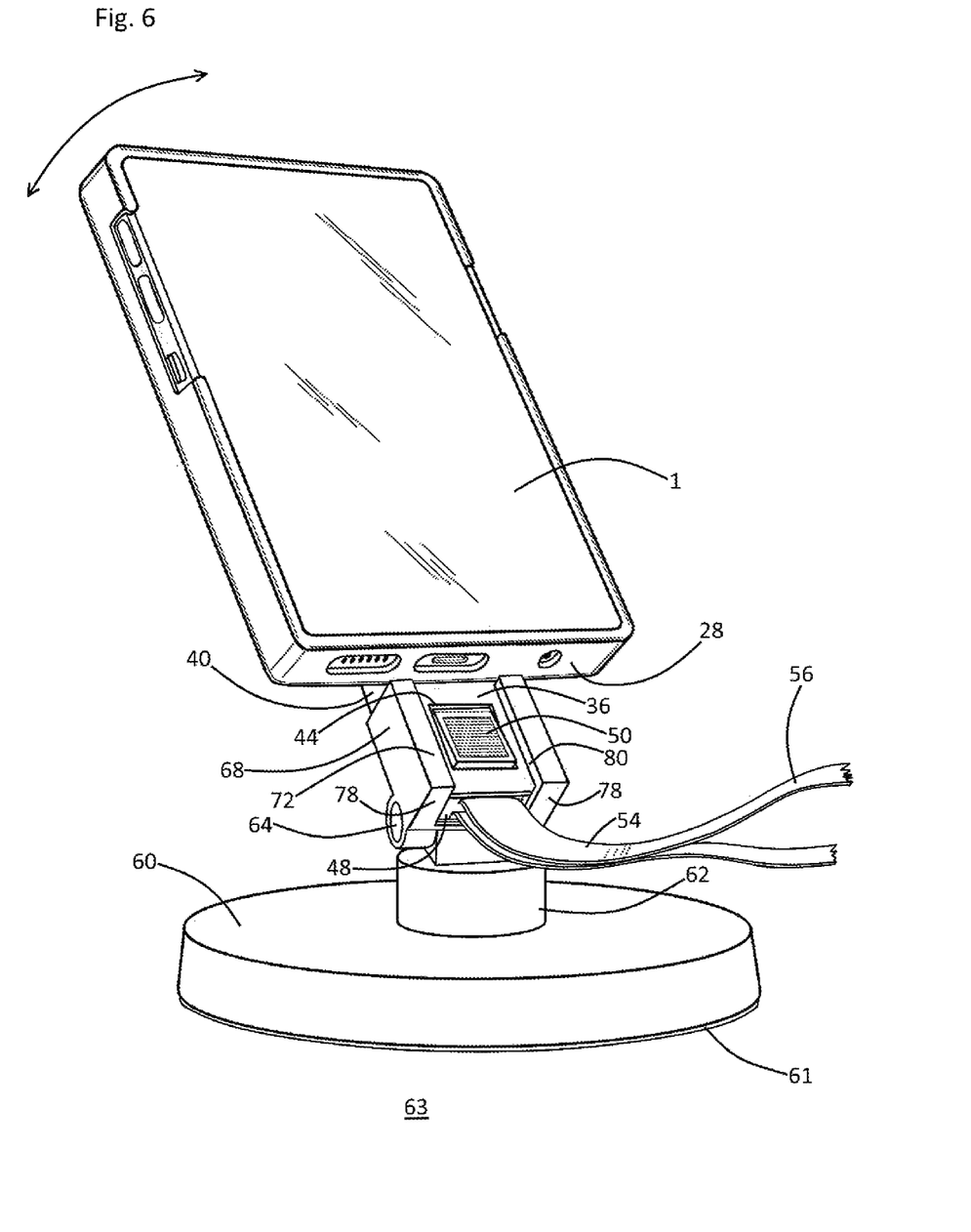
FIG. 6 presents a further alternate configuration of the structures depicted in FIG. 4.
Figure 7:
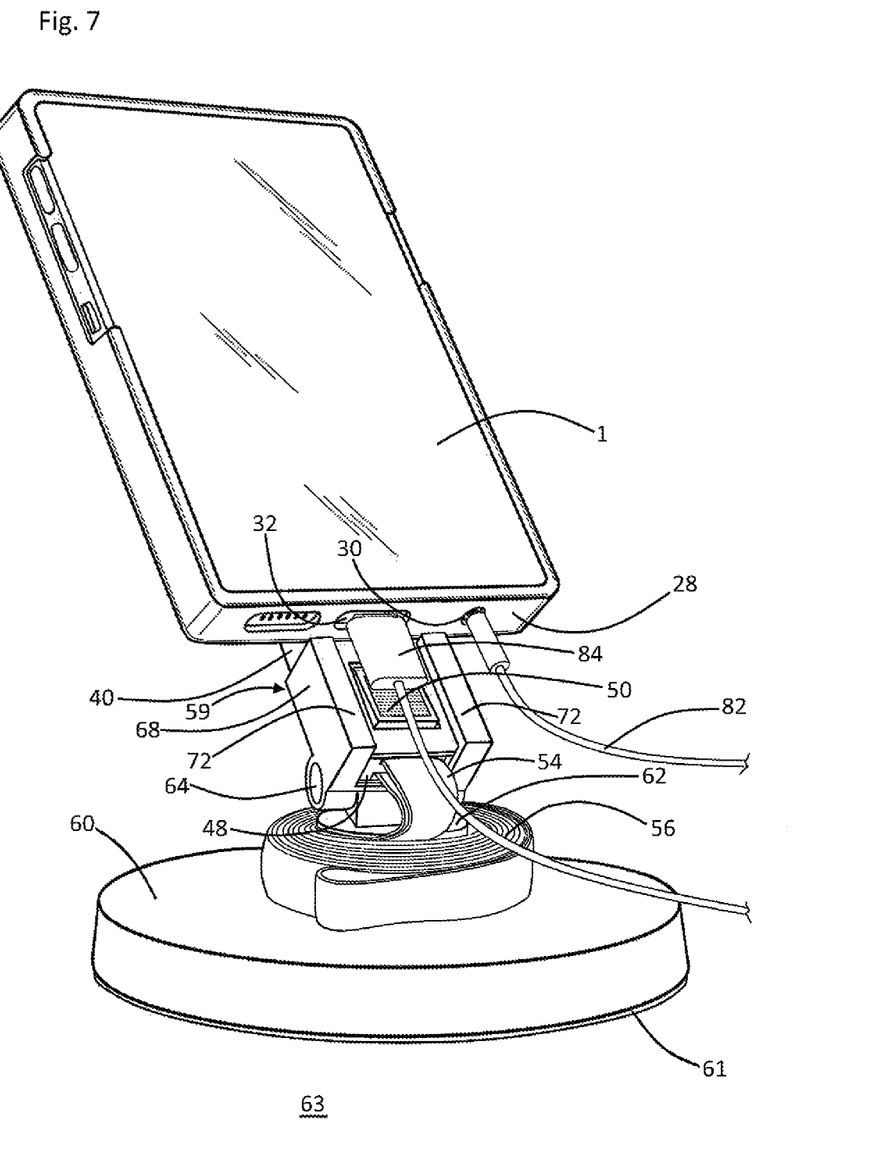
FIG. 7 redepicts the structures of FIG. 6, the view of FIG. 7 additionally showing power cord and headphone leads, and showing a lanyard in an alternative configuration.

Referring simultaneously to FIGS. 1-4, in order to securely and releasably hold the pin 48 in fastened engagement within bore 46 as indicated in FIG. 1, the first pin and socket fastener preferably operatively incorporates a spring and hook ledge combination. Referring to the example of FIG. 4, an exemplary spring hook component of such combination comprises a finger press tab 50 which is flexibly connected to pin 48 via a living hinge 49. The lower end of the tab 50 presents a hook edge 51 which, upon assembly of the fastener as indicated in FIG. 1, overlies and releasably engages a hook ledge 45 formed at the lower end of a latch release port 44 opening socket 39. Where the upper and lower halves of the first pin and socket fastener are inverted, as discussed above, the spring hook and hook ledge combination's hook ledge may alternatively reside at an upper edge of a similarly configured latch release port. The finger press tab 50 is preferably centrally positioned upon the front face of pin 48 so that, upon an assembly of components as indicated in FIGS. 5-7 (such assembly being further discussed below) both the tab 50 and the latch release port 44 are upwardly and forwardly presented for user access and actuation within a lanyard passage slot 80. Notwithstanding, the latching member represented by tab 50 may suitably be alternatively configured as paired or left and right side press hook arms (not depicted within views) which reside at left and right sides of pin 48. Where the pin component alternatively comprises such paired hook arms, edges of left and right latch release ports (also not depicted within views) may be engaged by such arms, such ports alternatively opening the socket 39 at side walls 40 and 42.

In use of the instant inventive assembly, and referring simultaneously to FIGS. 1-4, a user may initially fasten the first pin and socket fastener by snapping pin 48 into place within socket opening 46 as indicated in FIG. 1. Such fastening action moves the pin 48 from its FIG. 4 position to its FIG. 1 position. Thereafter, the user may extend loop 56 over his or her head, and may allow the cell phone and case to hang and distally suspend from the user's neck. During active cell phone use, the user may allow the cell phone and case to continue to be attached to lanyard 56. Alternatively, the user may conveniently detach the cell phone and case by depressing tab 50 and by slidably extracting the pin 48 from the socket 46.

Referring to FIGS. 4-7, the instant inventive assembly preferably further comprises a support base 60 and a second pin and socket fastener which, upon assembly, is positioned over and is supported by the support base 60. In the example of Drawing FIG. 4, a socket portion of the second pin and socket fastener is referred to generally by Reference Arrow 59, such socket comprising a back wall 65, a front wall 72, a left wall 68, and a right wall 70. Such walls preferably form and define a hollow bore having an upper opening 66 which is fitted for sliding and nesting receipt of the first pin and socket fastener's socket 39. Accordingly, the socket portion 39 of the assembly's first pin and socket fastener advantageously dually functions as a lanyard fastener and as a pin half of the assembly's second or base connecting pin and socket fastener.

Means for interconnecting and fixedly positioning the socket half 59 of the second pin and socket fastener over the base 60 are provided, such means suitably comprising a lanyard spooling column 62 having a hinge joint 64 at its upper end. The depicted hinge 64 and column 62 combination is intended as being representative of other base connectors such as rigid flanges, rigid stays, bonded connections, and whole or integral formations of the socket 59 with the base 60.

Referring simultaneously to FIGS. 1, 4, and 6, in order to facilitate a downward insertion of the pin half 48 of the assembly's first pin and socket fastener into the socket portion 59 of the second pin and socket fastener without interference with the attached lanyard 56, a lanyard passage slot 80 preferably opens the socket 59 at front wall 72, such slot 80 preferably further opening such socket at a base extension 81 within lower wall 78.

In use of the embodiment of the inventive assembly depicted in FIG. 6, the base 60 may rest upon a surface such as a desktop or vehicle dashboard 63. Preferably, the hinge 64 offers frictional resistance to pivoting movement in order to allow the user to selectively angularly move the cell phone and case frontwardly and backwardly as indicated by the FIG. 6's curved arrow. Such selective pivoting movement may conveniently align the cell phone and case orthogonally with respect to the user's sight line. During such base supported use, referring further to FIG. 7, the lanyard 56 may be compactly stored via spiral winding about the base's lanyard spooling column 62.

In the event that the user wishes to transition from the base supported mode of cell phone use depicted in FIGS. 6 and 7 to a neck lanyard suspension usage mode, as depicted in FIG. 1, the user may simply grasp the cell phone and case. Thereafter, the user may upwardly draw the attached socket 39 and snap fastened pin 48 out of the base socket 59. During such upward drawing action, the spooled lanyard 56 advantageously automatically un-spools and dispenses from the spooling column 62. Thereafter, the user may conveniently loop the lanyard 56 about his or her neck in the manner described above. A reversal of such steps conveniently re-configures the assembly for desktop or vehicle dashboard use as depicted in FIGS. 6 and 7.

The centrally positioned and upwardly facing exposures of tab 50 and latch release aperture 44 within the lanyard passage slot 80 allows the user to further alternatively depress tab 50 and upwardly remove the cell phone and case while the first pin and socket fastener's pin 48 and attached lanyard 56 remain in place as depicted in FIG. 5 or 7. Following such separated use of the cell phone and case, the socket 39 may be downwardly snapped into place upon base 60 by sliding the four peripheral walls of such socket between the outer walls of pin 48 and the four peripheral walls of socket 59.

Referring simultaneously to FIGS. 3 and 7, the first pin and socket fastener 39,48 is preferably positioned at a rearwardly stepped orientation with respect to the lower wall 28 of the case. Referring in particular to FIG. 7, such preferred rearwardly stepped configuration advantageously exposes the lower wall 28 over socket 59 and allows a power cord 84 and/or a headphone 82 to be conveniently attached during base support.

A pad 61 applied or attached to the undersurface of base 60 constitutes means for securing the base 60 upon the surface 63. As examples, the pad 61 is intended as being representative of a hook pad half of a flexible hook and loop pad fastener, a loop pad half of a flexible hook and loop pad fastener, an adhesive pad, a permanent magnet, a paramagnetic plate, a weight plate, a suction cup, or an elastomeric friction enhancing pad.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. An assembly for storing and deploying for use a hand held digital device, the hand held digital device having upper and lower ends and having front and back sides, the assembly comprising:
   (a) a case having a lower end, the case being adapted for nestingly receiving the hand held digital device;
   (b) a first pin and socket fastener having a pin receiving opening and comprising a spring hook and hook edge combination, said fastener having upper and lower halves, said upper half being fixedly attached to or formed wholly with the case; and
   (c) a flexible lanyard interconnect with the first pin and socket fastener's lower half; wherein, upon the case's nesting receipt of the hand held digital device, the case's lower end underlies said device's lower end; wherein the first pin and socket fastener's upper half is positioned at the case's lower end; wherein, upon the fastening of the first pin and socket fastener, the spring hook and hook ledge combination resists unfastening of said fastener; wherein the socket is further opened by a latch release port having a lower edge or having an upper edge, the spring hook and hook ledge combination's hook ledge comprising said lower or upper edge; and further comprising a base having upper and lower sides, and a second pin and socket fastener having upper and lower ends and having front and back sides, the second pin and socket fastener being mounted over the base, the second pin and socket fastener's pin comprising the first pin and socket fastener's socket.

2. The assembly of claim 1 further comprising a loop pair interconnecting the flexible lanyard and the first pin and socket fastener's lower half.

3. The assembly of claim 2 wherein the first pin and socket fastener's pin has a lower end, wherein the first pin and socket fastener's socket has a lower end, and wherein one of the loops among the loop pair is formed wholly with one of said lower ends.

4. The assembly of claim 1 wherein the second pin and socket fastener's socket opens upwardly for pin receipt, and further comprising a lanyard passage slot, said slot further opening said socket.

5. The assembly of claim 4 wherein the lanyard passage slot is positioned at the front side of the second pin and socket fastener's socket, such slot extending across such socket's lower end.

6. The assembly of claim 5 wherein the first pin and socket fastener's socket has a front side, wherein the latch release port is positioned at said front side, and wherein, upon the fastening of the second pin and socket fastener, said port opens at the lanyard passage slot.

7. The assembly of claim 6 further comprising a hinge adapted for facilitating pivoting movement of the case and the nestingly received hand held digital device backwardly and frontwardly with respect to the base.

8. The assembly of claim 7 further comprising a member selected from the group consisting of hook pad halves of flexible hook and loop pad fasteners, loop pad halves of flexible hook and loop pad fasteners, adhesive pads, permanent magnets, para-magnetic plates, weight plates, suction cups, and elastic friction pads, said member being fixedly attached to the lower side of the base.

9. The assembly of claim 7 further comprising a lanyard spooling column, said column spanning between the hinge and the base.

* * * * *